United States Patent
Maeno et al.

(10) Patent No.: US 6,403,050 B1
(45) Date of Patent: Jun. 11, 2002

(54) CALCIUM SILICATES, A PRODUCTION PROCESS THEREOF, AND AN INORGANIC ANTIBACTERIAL MATERIAL USING THE SAME

(75) Inventors: Masahiro Maeno, Ube; Harumichi Kuwabara, Kuroiso; Yasuhiko Kunimine, Tokyo, all of (JP)

(73) Assignee: Kunimine Industries Co., Ltd., Tokyo (JP)

( * ) Notice: Subject to any disclaimer, the term of this patent is extended or adjusted under 35 U.S.C. 154(b) by 0 days.

(21) Appl. No.: 09/559,579

(22) Filed: Apr. 28, 2000

(30) Foreign Application Priority Data

Apr. 30, 1999 (JP) .......................................... 11-124746

(51) Int. Cl.$^7$ ............................................. C01B 33/24
(52) U.S. Cl. ...................................................... 423/331
(58) Field of Search .......................................... 423/331

(56) References Cited

U.S. PATENT DOCUMENTS

| | | | |
|---|---|---|---|
| 3,928,539 A | * 12/1975 | Satoh et al. | 423/326 |
| 5,151,122 A | * 9/1992 | Atsumi et al. | 106/35 |
| 5,401,481 A | * 3/1995 | Rochelle et al. | 423/331 |

FOREIGN PATENT DOCUMENTS

| | | |
|---|---|---|
| DE | 4403781 A1 | 8/1995 |
| EP | 0585467 A1 | 3/1994 |
| EP | 11079729 | 3/1999 |
| EP | 11029760 | 5/1999 |
| JP | 49021240 | 5/1974 |
| JP | 54109096 | 8/1979 |
| JP | 61044712 A | 3/1986 |
| JP | 2019308 | 1/1990 |
| JP | 02255518 | 10/1990 |
| JP | 3193707 | 8/1991 |
| JP | 04126819 | 4/1992 |
| WO | WO990833 | 8/2000 |

OTHER PUBLICATIONS

Yoshihiko Okada et al., Behavior of . . .; Journal of the Ceramic Society of Japan, vol. 103, No. 2, Feb. 1, 1995, pp. 124–127.

Yoshihiko Okada et al.; Influence of . . . ; Journal of the Ceramic Society of Japan, vol. 102, No. 12, Dec. 1, 1994, pp. 1150–1154.

* cited by examiner

*Primary Examiner*—Steven P. Griffin
*Assistant Examiner*—Edward M. Johnson
(74) *Attorney, Agent, or Firm*—Birch, Stewart, Kolasch & Birch, LLP

(57) ABSTRACT

There is disclosed calcium silicates formed by reacting a silicic acid substance comprising an amorphous silicic acid gel obtained from clay minerals with a calcium compound. There also is disclosed a process for producing the same, and an inorganic antibacterial material using the same. The calcium silicates of the present invention have a high cationic exchange capacity and are excellent in the adsorbability of heavy metals. The inorganic antibacterial material according to the present invention can carry a sufficient amount of silver ions or silver complex ions and can be dispersed stably, for example, in a synthetic resin or the like. The production process according to the present invention can produce inorganic antibacterial material which are highly white and can be used suitably for various uses, and have sufficient antibacterial power.

3 Claims, 1 Drawing Sheet

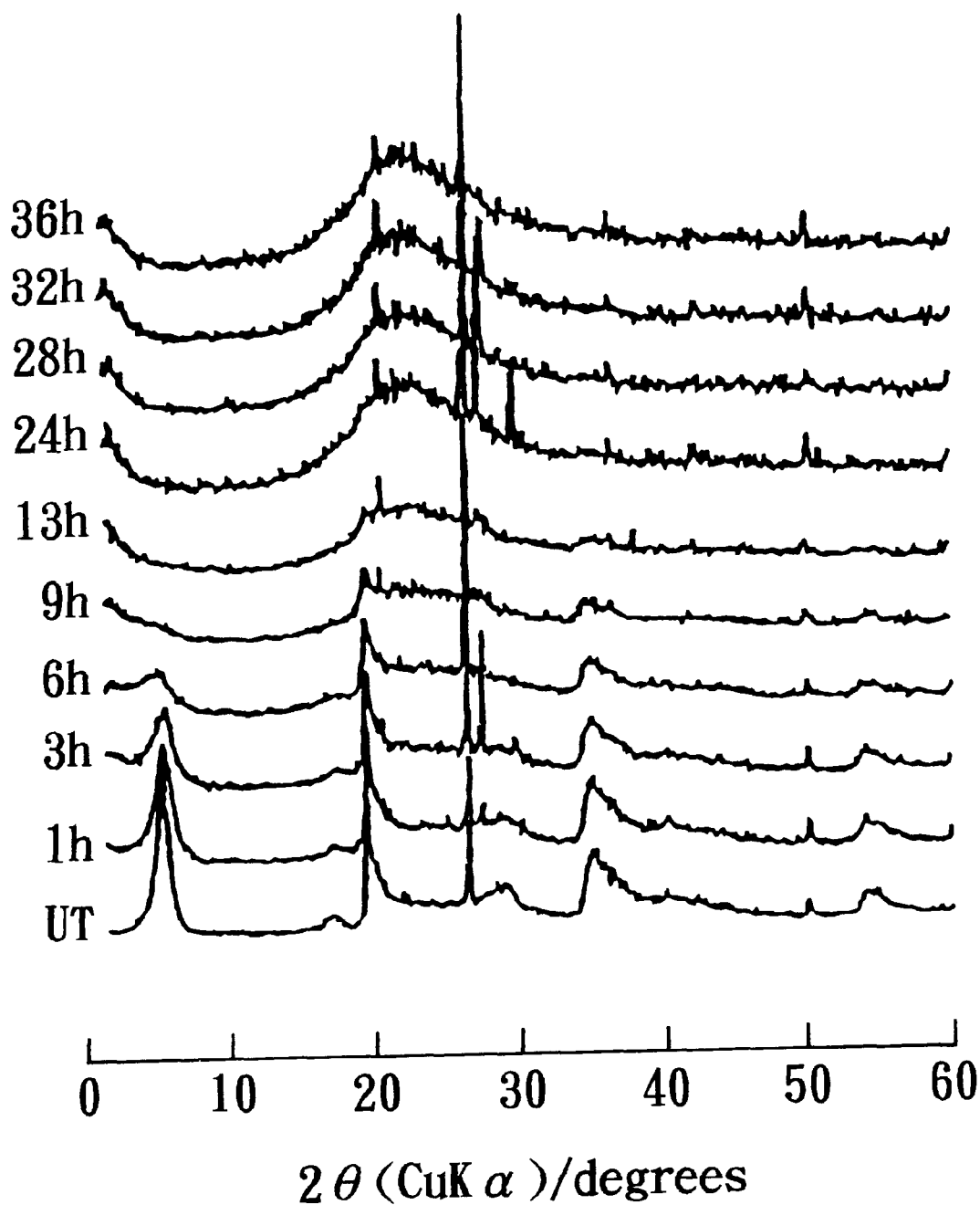

CALCIUM SILICATES, A PRODUCTION PROCESS THEREOF, AND AN INORGANIC ANTIBACTERIAL MATERIAL USING THE SAME

TECHNICAL FIELD

The present invention relates to a process for producing finely particulate calcium silicates by modifying smectites and the like, as well as calcium silicates excellent in whiteness, cation exchange capacity, and adsorbability, which are obtained by the production process.

Further, the present invention concerns an antibacterial calcium silicate, in which an antibacterial metal is carried on calcium silicates.

BACKGROUND ART

Antibacterial agent in admixture with a synthetic resin or the like, used for preventing miscellaneous bacteria from proliferating, include organic nitrogen series antibacterial agents and inorganic antibacterial agents having antibacterial metals carried on inorganic powder. Existent organic nitrogen series antibacterial agents have an excessively strong antibacterial effect, and they therefore involve the problem of having undesired effects on the human body or the natural environment. On the other hand, the use of safe antibacterial agents not having an excessively strong antibacterial effect involves the problem that the antibacterial effect is insufficient, unless the concentration of the antibacterial agent is controlled to a sufficiently high level near the surface of synthetic resin products and the like.

It has been known that metals, such as silver or copper or ions thereof, have sterilizing and antibacterial effects, and such metal ions, metal particles, or metal compounds are carried on inorganic materials and are released gradually therefrom, to provide antibacterial ability in inorganic antibacterial agents. As the carrier for the inorganic antibacterial agents, zeolite, apatite, phosphate, clay mineral, and glass are used. Since the carriers are inorganic materials, they can be said to be excellent in view of durability and heat resistance, and to be safe, having less effects on the human body or the like, compared with existent organic antibacterial agents.

In the meantime, among the antibacterial metals used in existent inorganic antibacterial agents, silver exhibits antibacterial ability to variety of bacteria, and it has strong antibacterial power. But silver has a drawback of low solubility. Further, antibacterial agents using silver cause coloring, and the application use is limited in the case of blending into synthetic resin, paint, or rubber by kneading or mixing. Further, silver ions cannot be supplied in an amount sufficient to suppress bacteria deposited on the surface of products, and, as a result, it has been difficult to provide sufficient antibacterial strength.

Specifically, it has been proposed to produce sterilizing silicates, from layerous silicates, such as smectites by replacing its cation with silver, copper, or the like, by utilizing their cationic exchanger ability as they are (JP-A Nos. Hei 2-19308 and Hei 3-193707), but they cannot be said to be sufficient in view of the sterilizing ability and the whiteness while the purified layerous silicates are used.

Further, existent natural calcium silicates are being deteriorated in cation exchange ability and adsorbability, and antibacterial agent-retaining ability, along with efflorescence. Therefore, such clay minerals wethered have little worth in practical use, and they are not suitable to various application uses for clay minerals that have crystalline structure.

SUMMARY OF THE INVENTION

It is, accordingly, an object of the present invention to provide calcium silicates excellent in the performances described above and easy to give a form of particulates that can be produced by utilizing by regenerating clay minerals which are deteriorated in the cation exchange ability and the adsorbability along with efflorescence, as well as a production process therefor.

A further object of the present invention is to provide an antibacterial silicate (antibacterial material) which is safe, having good whiteness and retaining of ability of antibacterial agent and capable of exhibiting a sufficient antibacterial power when used in synthetic resin, paint or rubber.

A further object of the present invention is to provide a process capable of producing, at low cost, inorganic antibacterial material which can be used for various application uses and have sufficient antibacterial power.

BRIEF DESCRIPTION OF THE DRAWING

The FIGURE shows the result of measurement by X-ray diffractiometry when acidic terra abla is subjected to sulfuric acid treatment for up to 36 hours in Example 1.

DETAILED DESCRIPTION OF THE INVENTION

The prevent inventors have made earnest studies in view of the foregoing subjects, have found that finely particulate novel calcium silicates having a high cationic exchange ability can be obtained by treating an amorphous silicic acid gel obtained by acidic decomposition of clay minerals with a calcium compound (for example, calcined lime) at a predetermined ratio. The present invention have been accomplished based on this finding.

That is, the present invention resides in the followings:

(1) calcium silicates formed by reacting a silicic acid substance comprising an amorphous silicic acid gel obtained from clay minerals with a calcium compound, (2) calcium silicates as defined in (1) above, wherein the amorphous silicic acid gel is obtained by acid decomposition of the clay minerals, (3) a process for producing calcium silicates as defined in (1) above, which comprises reacting silicic acid substance with a calcium compound at a molar ratio of the calcium compound as CaO to $SiO_2$ of the silicic acid substance of 0.10 to 0.70 at a temperature of 40° C. to 180° C. under a pressure from a normal pressure to 10 $kg/cm^2$, (4) a process for producing calcium silicates as defined in (3) above, wherein the amorphous silicic acid gel obtained by acid decomposition of the clay minerals and the calcium compound are reacted and then neutralized with an acid, (5) a process for producing calcium silicates as defined in (3) or (4) above, wherein the silicic acid substance and the calcium compound at a molar ratio, as CaO, of 0.10 to 0.70 to $SiO_2$ of the silicic acid substance are reacted at a temperature of 40° C. to 180° C. under a pressure from a normal pressure to 10 $kg/cm^2$ and then neutralized with an acid, (6) an inorganic antibacterial material in which silver ions or silver complex ions are carried, by ion exchange, on calcium silicates as defined in (1) or (2) above, (7) an inorganic antibacterial material as defined in (6) above, wherein the calcium silicates are crystalline calcium silicates, (8) an inorganic antibacterial material as defined in (6) above, wherein the silver complex ion is at least one selected from dicyanoargentate(I) ion, dithiosulfateargentate ion and dichloroargentate(I) ion, and (9) an inorganic antibacterial material as defined in (6) above, formed by adding an organic compound having an anti-mold function to an aqueous solution containing silver ions or silver complex ions and chelating carried on by ion exchange.

A process for producing calcium silicates according to the present invention will be explained at first.

Silicic acid substances containing amorphous silicic acid gels obtained from clay minerals will be first explained.

Any of clay minerals that form an amorphous silicic acid substance by acid substance decomposition can be used as the raw material for preparing the amorphous silicic acid gel used in the present invention. The clay minerals include, specifically, acid clay or bentonite of smectites series, kaolinite, halloysite or serpentine of kaoline series, silicite or illite of mica group series and sepiolite or palygorskite of ribbon structured minerals, acid clay, the bentonite or halloysite being preferred. Each of them may be used singly or as a mixture of two or more of them.

The amorphous silicic acid gel can be formed by acid decomposition from the clay minerals described above. The acid decomposition can be conducted by using, for example, an inorganic acid such as hydrochloric acid, sulfuric acid, nitric acid or phosphoric acid or an organic acid such as acetic acid or oxalic acid and the acid may be used singly or as a combination of two or more of acids.

While the treating conditions for the acid decomposition vary depending on the kind of the clay minerals, they are preferably reacted, for example, in a case of acid treatment of acid clay with sulfuric acid, at a temperature of 70 to 120° C. with a sulfuric acid concentration of 15 to 45% by weight, for 12 to 24 hours. Depending on the clay minerals to be used, a heat treatment or a chemical treatment can be applied optionally before the acid decomposition. The extent of the acid decomposition can be determined easily by X-ray diffractiometry and the conditions for the acid decomposition treatment can be set by identifying the disappearance of peaks and the change to amorphous state of smectites by X-ray diffractiometry.

The amorphous silicic acid gel may contain not acid-decomposed clay minerals to such a ratio as not giving any effects on the function as the carrier used in the present invention.

The silicic acid substances obtained by the acid decomposition as described above preferably have higher specific surface area, which is preferably 150 m²/g or more and, more preferably, 300 m²/g or more (according to BET method).

In the present invention, examples of the calcium compound to be reacted with the silicic acid substances include calcium chloride, slaked lime, milk of lime, calcium nitrate, calcium acetate or quick lime, in which calcium chloride, slaked lime, or quick lime are preferred, quick lime obtained by calcining limestone being used particularly preferably.

The ratio of the calcium compound to be used, in terms of CaO, is preferably at a molar ratio of 0.10 to 0.70 and, further preferably, 0.15 to 0.45 to $SiO_2$ of the silicic acid substance.

The calcium compound can be added to silicic acid substances which have been made sol with addition of water, stirred and mixed to react them. Alternatively, the calcium compound may be stirred and mixed together with the silicic acid substances in water, or the calcium compound previously formed as an aqueous solution may be mixed with silicic acid substances or an aqueous solution of a silicic acid aqueous sol.

There is no particular restriction on the reaction between the silicic acid substances and the calcium compound but the reaction is conducted at a temperature preferably from 40 to 200° C., more preferably, 40 to 180° C. and, particular preferably, 60 to 150° C. A pressure from a normal pressure to 10 kg/cm² is preferred.

In the present invention, after the reaction of the silicic acid substances and the calcium compound, neutralization treatment with an acid can be conducted optionally. As the acid for the neutralization, the acid mentioned as usable for the acid decomposition described above can be enumerated in which the pH value is preferably from 6.0 to 8.0 and, more preferably, pH 7.0. Further, the time for the neutralization treatment is preferably from 60 to 120 min. This neutralization contributes to provision of calcium silicates of a fine grain size and with an increased specific surface area.

The calcium silicates according to the present invention have high cation exchange ability and high antibacterial agent-retaining ability and thus are suitable for the production of inorganic antibacterial materials. Further, since they have high selective adsorbability to heavy metals, they can be used for heavy metal elimination by utilizing such selective adsorbability. The application uses described above are to be explained below.

In the inorganic series antibacterial material according to the present invention, calcium silicates are used as a carrier. Calcium silicate has a variety of composition in which calcium oxide and silicon dioxide bond to each other at various ratios. Those having ion exchange ability can be used with no particular restriction in the present invention and those having higher ion exchange ability are preferred. Generally, a composition having $CaO/SiO_2$ at about 0.03 (weight ratio) has high cation exchange capacity. Further, in the present invention, crystalline calcium silicates can be used preferably.

It is desirable that the calcium silicates used in the present invention be fine particulate and have an average grain size, preferably, from 0.5 to 20 μm and, further preferably, from 2 to 10 μm.

The calcium silicates used preferably in the present invention can include calcium silicates obtained by reacting amorphous silicic acid substances, preferably, amorphous silicic acid gel and calcium compound. When calcium silicate is synthesized by reacting sodium silicate as chemicals with calcium chloride as usually conducted, sodium chloride is formed as by-products. Thus it is washed with water and then dried and pulverized to obtain an aimed product. On the other hand, in a case of reacting the amorphous silica with calcium (calcium hydroxide), the water washing step can be omitted and no by-products are formed. Further, the amorphous silicic acid gel easily forms by stirring a colloidal solution with extremely high activity and good reactivity. Since dried products of calcium silicate obtained by using the amorphous silicic acid gel is a extremely white lump composed of particulates and are too soft to hold by fingers and they break-dowm easily, they are suitable calcium silicate to be used as fine white grains (usable as it is as thickener, thixotropic agent or reinforcement agent such as for robber, cosmetic, resin or paint) without being subjected to pulverizing step.

Preferred amorphous silicate acid gel include those that are obtained by using clay minerals as starting materials.

Carrying of silver ions or silver complex ions on the calcium silicates as described above can be carried out by immersing calcium silicates into an aqueous solution containing silver ions or silver complex ions, optionally neutralizing anions in the aqueous solution with an alkali salt or an alkali hydroxide to conduct ion exchange. The amount of the silver ions or silver complex ions to be carried is, preferably, from 0.01 to 0.1 g and, more preferably, from 0.02 to 0.08 g, in terms of Ag, based on 1 g of the calcium silicates.

Examples of the aqueous solution containing silver ions include, aqueous solutions of nitrate, fluoride, chlorate, perchlorate, acetate or sulfate 6f silver. Among these an aqueous solution of at least one soluble silver salt selected from silver sulfate, silver acetate and silver nitrate is preferred. Preferred aqueous solution containing silver complex ions are aqueous solutions containing dicyanoargentate(I) ions, dithiosulfateargentate ions and dichloroargentate(I) ions. The concentration of the aqueous solution is preferably from 10 to 50 g/l.

In the aqueous solution, other organic compound can further be added to optionally. They can include, for example, 2-(4-thiazolyl)benzimidazole and cetyltrimethyl ammonium chloride, having anti-molding effect. The amount of the organic compound to be used can be determined properly considering a range not deteriorating the purpose of the invention. When the organic compound is used, it is incorporated in an aqueous solution containing silver ions or silver complex ions, chelated and then carried by ion exchange.

The inorganic antibacterial material according to the present invention can be obtained, after the carrying treatment, by washing, drying and arbitrary pulverizing to 0.5 to 30 $\mu$m, which is an average grain size. Drying is conducted, preferably, until the water content is reduced to 5% by weight or less. It can be dried by a usual heating method, as well as freeze drying or the like.

According to the present invention, white antibacterial calcium silicic acid substances (antibacterial materials) can be obtained and used suitable for various application uses.

The inorganic antibacterial material according to the present invention has excellent dispersion stability and can be used for synthetic resin, paint or rubber by kneading and mixing without using any additional support material. When the antibacterial material according to the present invention is kneaded in the synthetic resin, it can provide an excellent effect of not coloring or discoloring the resin and keeping transparency and the smoothness on the surface of the resin as they are. In a case when the material is used mixed with a liquid material such as a paint, material of a smaller average grain size is preferred since it can form a highly stable suspended state. Further, the antibacterial material according to the present invention can be granulated into a flaky form, which is suitable for blending into a film or a coating layer. The flaky antibacterial material takes a so-called card house structure in a solution state and can keep a stable suspended or dispersed state.

Further, the inorganic antibacterial material according to the present invention is also excellent in the chemical resistance.

Further, the calcium silicates according to the present invention show high selective adsorbability to heavy metals, for example, lead, cadmium, chromium and nickel. Accordingly, they can be used by addition to waste waters as a waste water treating material for eliminating heavy metals.

The method of eliminating heavy metals from the waste waters comprises adding the treating material to a waste water, mixing and stirring the water, and filtering the treating material that adsorbed the heavy metals for removal of heavy metals.

Calcium silicates obtained by the process according to the present invention have a high cationic exchange capacity and are excellent in the adsorbability of heavy metals.

Since the inorganic antibacterial material (antibacterial silicate) according to the present invention can carry a sufficient amount of silver ions or silver complex ions and can be dispersed stably, for example, in a synthetic resin or the like; an object of antibacterial treatment, the material can provide a sufficient antibacterial effect with a small amount and then it is safe. According to the present invention, since the antibacterial material is in a state of white calcium silicate, it does not color the synthetic resin or the like undesirably and does not deteriorate the commercial value, as well as the antibacterial material itself is less discolored or colored by sunlight or the like. Accordingly, a synthetic resin or the like colored to an optional color can be prepared in the presence of antibacterial material of the present invention. Further, the antibacterial material according to the present invention can be used without deteriorating the transparency or the surface smoothness of the synthetic resin or the like itself. The material can be formed into a flaky granular antibacterial material of further excellent dispersibility or suspension property and can be used suitably, for example, for films or coating layers.

Further, since the antibacterial material according to the present invention using the calcium silicates obtained by neutralization with an acid after reaction between the silicic acid substance and the calcium compound is in a finely particulate state with high dispersibility and large specific surface area, it can carry a large amount of silver ions or silver complex ions on it and exhibits an excellent effect capable of controlling the amount of silver ions or silver complex ions. More specifically, the inorganic antibacterial material of the present invention can be used for resin compositions, films, packaging materials, fibers, filter materials or paints and can provide them with an excellent antibacterial ability.

The production process according to the present invention can produce inorganic antibacterial materials which are highly white and can be used suitably for various uses, and have sufficient antibacterial power.

EXAMPLE

Then, the present invention will be explained more specifically with reference to examples but the invention is not restricted only to them.

In the examples, "%" for compositions means "% by weight" unless otherwise specified.

Example 1

Water was added to 2 kg of hydrous starting minerals (38.7% water content) of acid clay yielded in Togatta, Karita-gun, Miyagi-ken as clay minerals ($SiO_2$: 77.64, $Al_2O_3$: 13.25%, $Fe_2O_3$: 2.00%, MgO: 3.64%, CaO: 1.48%, $Na_2O$: 1.32%. $K_2O$: 0.33%), which was wet pulverized in a ball mill to 23.8% solid concentration and hydraulically elutriated to obtain slurry (solid concentration: 20.4%), adjusted to 35% sulfuric acid solution, heated in a warm bath at 70° C. and reacted for 36 hours. During the process, a small amount of sample was taken, washed with water, dried and then measured for X-ray diffractiometry. The result is shown in the figure (result for the measurement of X-ray diffractiometry at 0 hr, 1 hr, 3 hr. 6 hr, 9 hr, 13 hr, 24 hr, 28 hr, 32 hr and 36 hr after sulfuric acid treatment, shown successively from the bottom of the chart). As can be seen from the figure, peaks of smectites almost disappeared showing conversion into an amorphous state 24 hours after the sulfuric acid treatment although quartz is recognized as impurities. 36 hours after the sulfuric acid treatment, white amorphous silicic acid having 465 m²/g of specific surface area (BET method) was obtained.

The hydrogel of the amorphous silicic acid was adjusted with water to $SiO_2$ concentration of 10.0 g/100 ml with water and wet pulverized in a ball mill to form sol. Milk of lime (CaO: 6.50 g/100 ml) was added to 500 ml of the silica sol such that the $CaO/SiO_2$ molar ratio was 0.2, 0.3 or 0.4, reacted on a warm bath at 70° C. under a normal pressure for 90 min, filtered, dried in a thermostable drier at 105 to 110° C. and then pulverized by Sample-Mill manufactured by (Fuji Powder Co.) to obtain samples Nos. 1 to 3 of crystalline calcium silicate to be used as a carrier.

The cationic exchange capacity of the thus obtained sample No. 2 as the crystalline calcium silicate was 106.8. The results are shown together with those for the starting material and the intermediate product in the following table.

TABLE 1

|  | Cation exchange capacity (meq/100 g) |
| --- | --- |
| Acid clay as starting material | 76.8 |
| Elutriated slurry | 80.3 |
| Sample No. 2 | 106.8 |

Example 2

Milk of lime (CaO: 6.50 g/100 ml) was added to 500 ml of the same silica sol as used in Example 1 such that the $CaO/SiO_2$ molar ratio was 0.3, and reacted on a warm bath at 70° C. under a normal pressure for 90 min. Then, 10% hydrochloric acid was added until pH was lowered to 7.0, stirred at 70° C. for 60 min and then washed with water and filtered. After drying in a thermostable drier at 105 to 110° C., the product was pulverized in Sample-Mill to obtain a sample No. 4 of crystalline calcium silicate as a carrier.

Table 2 shows the average grain size and the specific surface area for each of sample Nos. 1–4. The average grain size was small and the specific surface area was increased remarkably in No. 4, compared with No. 2, and it can be seen that more preferred calcium silicate was obtained by neutralization with the acid after reaction with the calcium compound.

TABLE 2

| Sample No. | 1 | 2 | 3 | 4 |
| --- | --- | --- | --- | --- |
| Average grain size ($\mu$m) | 4.0 | 2.5 | 1.5 | 1.2 |
| Specific surface area (m²/g) | 124 | 146 | 251 | 280 |

Example 3

10 g of the sample No. 1 of the crystalline calcium silicate obtained in Example 1 was added to 100 ml of an aqueous 1% solution of silver nitrate and, while stirring, 1% aqueous ammonia was dropped to make the solution pH 8, further stirred for 30 min and filtered and then washed with 100 ml of deionized water and then with 100 ml of methanol. The product was dried at 70° C. to water content of 1% or lower and pulverized in a single track jet mill (manufactured by Seishin Kigyo-sha) to obtain an inorganic antibacterial material (white, about 0.04 g of silver carried in terms of Ag based on 1 g of carrier).

Whiteness of the obtained material and starting material are measured by an autographic recording spectrophotometer U-3200 type (made by Hitachi Seisakusho).

The results are shown in Table 3 below. As is apparent from the results in the table, inorganic antibacterial material obtained showed extremely high whiteness.

TABLE 3

| Specimen | Whiteness (%) |
| --- | --- |
| Acid clay as raw material | 62 |
| Crystalline calcium silicate (Sample No. 2) | 97 |
| Inorganic antibacterial material of Example 3 | 96 |

Example 4

300 g of deionized water was heated to 40° C., to which 2.3 g of silver acetate was added and stirred to dissolve silver acetate and while stirring, 9.8 g of 1% sodium sulfite was added and, further, 6.4 g of sodium thiosulfate was added. Then 48 g of the sample No. 2 of crystalline calcium silicate obtained in Example 1 was added, stirred continuously for 30 min, dried at 60° C. to water content of 1% or lower and then pulverized in a single track jet mill (manufactured by Seishin Kigyo-sha) to obtain an inorganic antibacterial material according to the present invention (white, about 0.05 g of silver carried in terms of Ag based on 1 g of carrier).

Example 5

An aqueous 5% solution of silver nitrate and 2-(4-thiazolyl)benzimidazole (TBZ) were mixed and stirred such that silver nitrate : TBZ in molar ratio was 1:2 to form an aqueous solution of silver TBZ chelate. An aqueous solution containing the silver TBZ chelate in an amount equivalent with the cation exchange capacity of the crystalline calcium silicate of sample No. 3 obtained in Example 1 was added, filtered at 80° C. for 75 hours, filtered and washed with deionized water and then freeze dried to 3% water content, to obtain an inorganic antibacterial material with an average grain size of 2.0 $\mu$m according to the present invention (white, about 0.05 g of silver carried in terms of Ag based on 1 g of carrier).

Example 6

An inorganic antibacterial material (white, about 0.05 g of silver carried as Ag based on 1 g of carrier) with an average grain size of 3.0 $\mu$m according to the present invention was obtained quite in the same manner as in Example 3 except for using the sample No. 4 obtained in Example 2 instead of the sample No. 1 of crystalline calcium silicate.

Reference Example

To 10 grams of inorganic antibacterial materials obtained in Examples 3 to 6, 300 g of distilled water was added and they are stirred, and then subjected to filtration to measure the amount of silver included in the filtrate. Measurement was conducted by using atomic-absorption spectrophotometer SAS 7500 type (made by Seiko electron industry). The results are shown in Table 4. As is apparent from the results in Table 4, silver is scarcely included in the filtrate showing silver was hold in the calcium silicate firmly.

TABLE 4

| Sample | Silver concentration (ppm) |
| --- | --- |
| Example 3 | 0.00 |
| Example 4 | 0.03 |
| Example 5 | 0.00 |
| Example 6 | 0.00 |

Comparative Example 1

An inorganic antibacterial material was obtained in the same manner as in Example 4 except for using the same acid clay yielded in Togatta, Karita-gun, Miyagi-ken as those used in Example 1 instead of the sample No. 2 of crystalline calcium silicate.

Comparative Example 2

An inorganic antibacterial material was obtained in the same manner as in Example 5 except for using bentonite (Kunigel Vl; trade name of product manufactured by Kunimine Kogyo Co.) instead of the sample No. 3 of crystalline calcium silicate.

Comparative Example 3

An inorganic antibacterial material was obtained in the same manner as in Example 5 except for using the same acid clay yielded in Togatta, Karita-gun, Miyagi-ken as those used in Example 1 instead of the sample No. 3 of crystalline calcium silicate.

Comparative Example 4

An inorganic antibacterial material was obtained quite in the same manner as in Example 4 except for using bentonite (Kunigel Vl; trade name of product manufactured by Kunimine Kogyo Co.) instead of the sample No. 4 of crystalline calcium silicate.

Inorganic antibacterial materials were prepared in the same manner as in Comparative Examples 2 and 4, except that the bentonite (Kunigel VI) was changed to another bentonite (Kunipia) in the respective Comparative Examples.

All of the antibacterial materials obtained in Comparative Examples 1 to 6 were coarse with a grain size of 50 to 100 μm and, further, no white products were obtained.

The whiteness of the inorganic antibacterial agents obtained in Example 3 to 6 and Comparative Examples 1 to 6 was evaluated by four step criterion from A (white) to D (dark gray). The results are shown in the following Table 5.

TABLE 5

| Sample | Whiteness |
| --- | --- |
| Example 3 | A |
| Example 4 | A |
| Example 5 | A |
| Example 6 | A |
| Comparative Example 1 | D |
| Comparative Example 2 | D |
| Comparative Example 3 | D |
| Comparative Example 4 | D |
| Comparative Example 5 | C |
| Comparative Example 6 | C |

Test Example 1

The antibacterial ability, the dispersion stability and the discoloration property of the inorganic antibacterial material obtained in Example 3 to 5 were tested by the following methods.

① Antibacterial Ability

Each of the specimens was dispersed in distilled water to prepare an 1% liquid dispersion and conditioned in 20 ml of bacteria culture medium so as to be 50 to 1000 ppm and then cured. Then, Escherichia coli or Staphylococcus aureus were coated each by one platinum loop amount on the surface of each medium, and cultured in a thermostable bath controlled to 28±2° C. for two days. The minimum antibacterial material addition concentration at which no growth was recognized (minimum grow inhibition concentration) was measured. The result is shown in Table 6.

As the medium, a bouillon medium prepared by dissolving 3 g of meat extract, 10 g of peptone, 5 g of sodium chloride and 15 g of agar into 1000 ml of distilled water and then sterilizing them in an autoclave at 121° C. for 15 min was used.

② Dispersion Stability and Discoloration Property

Each one part by weight of the inorganic antibacterial agents obtained in Example 3 to 5 was blended with 99 parts by weight of an ABS (acrylonitrile—butadiene—styrene) resin, mixed in a tumbler mixer for about 20 min and then heated at about 200° C. and kneaded in an kneader. Then, strands taken out of the kneader was immersed and cooled in water and then drained thoroughly and cut into pellets of about φ20 mm (diameter)×3 mm. They were heated in a molding machine to 220° C. and injection molded into a molding die of 2 cm×3 cm×2 mm, and the dispersion stability and the discoloration property for each of the antibacterial material in the resin were observed by viewing and evaluated based on the following standards.

(Dispersion Stability)

⊚: Uniformly dispersed with no separation or precipitation

○: Slight separation and precipitation observed

Δ: Separation and precipitation observed

X: Separation and precipitation observed entirely (Discoloration Property)

⊚: No discoloration observed

○: Slight discoloration observed

Δ: Discoloration observed

X: Blackening observed in the resin

For comparison, identical measurement was conducted also for the inorganic antibacterial material using commercially available zeolite as a carrier (Comparative Example 7) and crystalline calcium silicate sample No. 2 obtained in Example 1 (Comparative Example 8), and the results are shown in Table 6.

TABLE 6

| | Minimum grow inhibition concentration (ppm) | | | |
| --- | --- | --- | --- | --- |
| | Escherichia coli | Staphylococcus aureus | Dispersion stability | Discoloration |
| Example 3 | 300 | 400 | ⊚ | ○ |
| Example 4 | 400 | 200 | ⊚ | ⊚ |
| Example 5 | 300 | 300 | ○ | ⊚ |
| Comparative Example 7 | 500 | 600 | Δ | Δ |

TABLE 6-continued

| | Minimum grow inhibition concentration (ppm) | | | |
| --- | --- | --- | --- | --- |
| | *Escherichia coli* | *Staphylococcus aureus* | Dispersion stability | Discoloration |
| Comparative Example 8 | 1000 or more | 1000 or more | X | ⊚ |

As can be seen from the result in Table 6, the inorganic antibacterial material according to the present invention could effectively inhibit growing of bacteria at a low concentration. Since all of the antibacterial material obtained in Examples 3 to 5 had good whiteness, they caused specific coloration when mixed in the resin and had high dispersion stability and showed no discoloration even when kneaded with the resin.

Test Example 2

The antibacterial power of inorganic antibacterial material obtained in Examples 4 to 6 was tested by the following methods.

① Test by the reduced cell number counting method 1 g of Escherichia coli was added to 50 ml of sterilized physiological saline to which test bacteria (*Escheria coli* (IFO 3806)) was inoculated and cultured under shaking for one hour. Subsequently, viable cell count was measured and the sterilization ratio (sterilization ratio=[(vial cell count of inoculated bacteria—vial cell count after 1 hr)/vial cell count of inoculated bacteria]×100) was determined based on the difference relative to the number of inoculated bacteria to evaluate the antibacterial power.

② Halo Test

After crushing the antibacterial material obtained in Examples 4 to 6 in a mortar, tablets were molded by applying a pressure of about 8 t/cm$^2$, and the tablet was buried in the center of a meat extract agar broth agar plate culture medium inoculated with test bacteria (*Escherichia coli*) (prepared by dissolving 10 g of peptone, 5 g of sodium chloride, 10 g of meat extract and 5 g of agar in distilled water of 1 litre, sterilized in an autoclave under the conditions at 121° C., 1 atm for 20 min, inoculated with test bacteria and cast and solidified in a petri dish). They were cultured for two hours in a thermostable bath at 28±2° C. After culturation, halo (inhibition circle) was observed to evaluate the antibacterial power.

As the comparison, identical measurement was also conducted to the inorganic antibacterial material using commercially available zeolite as a carrier (Comparative Example 5) and the test specimen No. 4 of calcium silicate obtained in Example 2 (Comparative Example 7) and the result is shown in Table 7.

TABLE 7

| | Sterilized cell counting method | | |
| --- | --- | --- | --- |
| | Vial cell count (N/ml) | Sterilizing rate | Halo method |
| Example 4 | 0 | 100% | Inhibiting circle formed |
| Example 5 | 0 | 100% | Inhibiting circle formed |

TABLE 7-continued

| | Sterilized cell counting method | | |
| --- | --- | --- | --- |
| | Vial cell count (N/ml) | Sterilizing rate | Halo method |
| Example 6 | 0 | 100% | Inhibiting circled formed |
| Comparative Example 7 | 1.5 × 10$^5$ | 75.8% | Inhibiting circle not formed |
| Comparative Example 9 | 1.3 × 10$^5$ | 79.0% | Inhibiting circle not formed |

As is apparent from the result shown in Table 7, while the inhibition circle was not formed and the sterilization ratio was less than 80% in Comparative Examples 7 and 9, the inhibition circles were formed in each of the antibacterial materials of Examples 4 to 6 and 100% sterlization could be attained.

Further, when specimens of Examples 4 to 6 and Comparative Example 7 and 9 were exposed to sunlight for seven days, while Comparative Examples 7 and 9 discolored to dark gray, the antibacterial materials of Examples 4 to 6 showed no substantial change.

Example 7

Adsorbability Test for Heavy Metal

Adsorbability for heavy metals were determined by the change of concentration using a batch method. Chlorides of lead and cadmium were used as the heavy metals. Kunipia F and the crystalline calcium silicate obtained in Synthesis Example 1 were added each by 0.1 g to 50 ml of a solution of each of the chlorides (100 mg/l), left for respective times shown in the table and filtered to analyze heavy metals remaining in the filtrates to determine the adsorbability to each of the heavy metals. As a result, the product of the present invention obtained in Example 1 (No. 2) has high adsorbability and high adsorption speed.

TABLE 8

| Cadmium adsorption ratio (%) | | | | |
| --- | --- | --- | --- | --- |
| Adsorption time (min) | 1 | 5 | 15 | 30 |
| Product of the invention | 79 | 90 | 98 | 99 |
| Kunipia F | 15 | 27 | 38 | 40 |

TABLE 9

| Lead adsorption ratio (%) | | | | |
| --- | --- | --- | --- | --- |
| Adsorption time (min) | 1 | 5 | 15 | 30 |
| Product of the invention | 88 | 95 | 99 | 99 |
| Kunipia F | 39 | 51 | 60 | 61 |

What is claimed is:

1. An inorganic antibacterial material in which silver ions or silver complex ions are carried, by ion exchange, on calcium silicates formed by reacting a silicic acid substance comprising an amorphous silicic acid gel obtained from clay minerals with a calcium compound, wherein the silver complex ion is at least one selected from the group consisting of dicyanoargentate(I) ion, dithiosulfateargentate ion and dichloroargentate(I) ion.

2. The inorganic antibacterial material as claimed in claim 1, wherein the calcium silicates are crystalline calcium silicates.

3. The inorganic antibacterial material as claimed in claim 1, formed by adding an organic compound having an anti-mold function to an aqueous solution containing silver ions or silver complex ions and chelating carried on by ion exchange.

* * * * *